Oct. 7, 1952 — L. A. SKINNER — 2,612,747
ROCKET HAVING ADJUSTABLE DISCHARGE PASSAGE
Filed Jan. 25, 1945
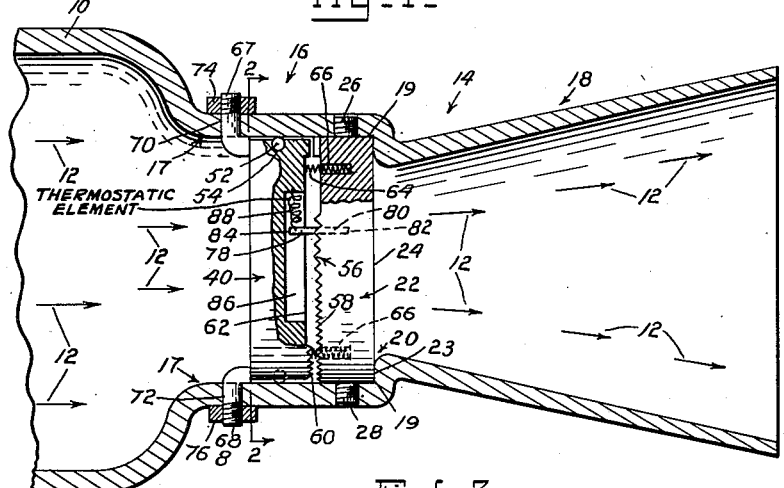
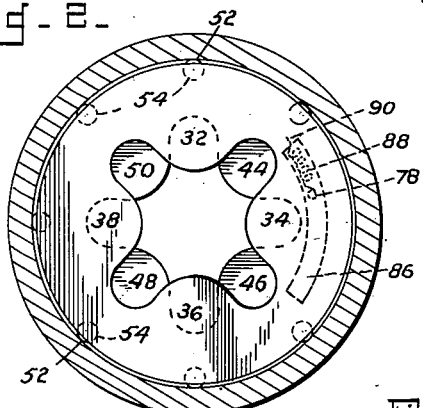
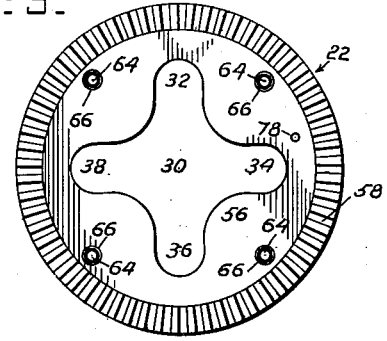
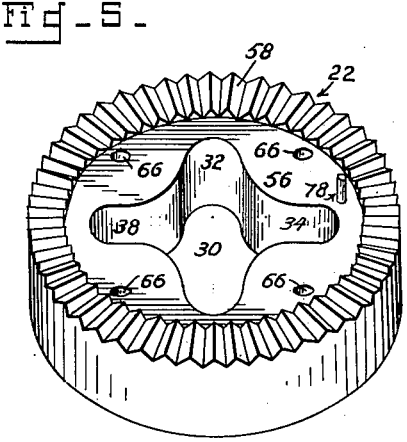
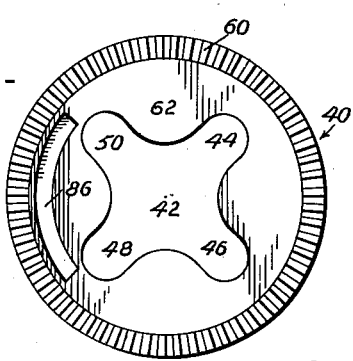
Inventor
Leslie A. Skinner Patented Oct. 7, 1952

2,612,747

UNITED STATES PATENT OFFICE 2,612,747

ROCKET HAVING ADJUSTABLE DISCHARGE PASSAGE

Leslie A. Skinner, Berkeley, Calif., assignor to the United States of America as represented by the Secretary of War Application January 25, 1945, Serial No. 574,598

3 Claims. (Cl. 60—35.6)

(Granted under the act of March 3, 1883, as amended April 30, 1928; 370 O. G. 757)

The invention described herein may be manufactured and used by or for the Government for governmental purposes without the payment to me of any royalty thereon.

This invention relates to rockets. A purpose of the invention is to provide a means of varying the cross-sectional area of the passageway through which the gases pass out of the rocket casing.

A further purpose of the invention is to provide a means for adjusting the orifice cross-section of a rocket as the ambient temperature changes.

Another purpose of the invention is to provide a means for automatic adjustment of the orifice cross-section of a rocket for optimum performance depending upon ambient temperature at the time of firing.

Other purposes of the invention will become apparent from the following specification and claims.

The accompanying drawing forming a part of this specification illustrates a preferred embodiment of the invention. In the drawing, Figure 1 is a longitudinal sectional view of the rearward portion of a rocket including the invention, Figure 2 is a sectional view taken along the line 2—2 of Figure 1, Figure 3 is a detail elevational view of a stationary disk, Figure 4 is a detail elevational view of a movable disk, and Figure 5 is a perspective detail view of the disk shown in Figure 3.

It is well known that double base powders and others which are used for rocket propulsion having a burning rate which increases with an increase in ambient temperature at the time the rocket is fired, and decreases as the ambient temperature decreases. Since a higher burning rate increases the rate of liberation of gases inside the rocket and hence the gas pressure, it is desirable to adjust the size of the gas discharge passageway leading out of the rocket to accord with the ambient temperature in order to achieve optimum performance, by maintaining approximately constant pressure inside the rocket for a wide range of ambient temperatures.

The adjustment may be made by hand, or it may be automatic. This invention has as an important purpose the provision of means for making such adjustment before the rocket is fired.

In Figure 1, gases are generated inside the rocket body casing 10 and follow the path indicated by the arrows 12 while passing out of the rocket into the air. The gases pass out through a nozzle 14 which includes a constricted portion 16 and an expanding portion 18. The inside diameter of the constricted portion 16 is constant from the point 17 to the point 19 at which the latter point the inner casing surface diameter decreases radially to point 20 which is also the starting point of the expanding portion 18 of the nozzle. The contour at point 20 is slightly rounded as shown.

A disk 22 having an outside diameter substantially equal to the inside diameter of the casing 10 at point 19, is inserted into the constricted portion 16 of the nozzle 14 with one face 24 of the disk 22 bearing against the shoulder 23 formed by the inner casing surface between points 19 and 20. Set screws 26 and 28 threaded through casing wall 10 as shown, serve to hold the disk 22 tightly in place against the shoulder 23 as shown.

The stationary disk 22, as is shown in the detail views in Figures 3 and 5, has a central longitudinal cut-out portion or passageway 30 extending through the thickness of the disk, the passageway 30 being formed with four lobes or grooves 32, 34, 36 and 38, the axes of the lobes being separated by ninety degrees as shown.

A second disk 40, shown in a detail elevation in Figure 4, is slightly smaller in diameter than disk 22, and also has a longitudinal cut-out portion or passageway 42 extending through the thickness of the disk 40, the passageway 42 being the same size and shape as passageway 30 of disk 22 and having four lobes or grooves 44, 46, 48 and 50 as shown.

Ball bearing 52 loosely inserted in recesses 54 are disposed about the periphery of movable disk 40 as shown, and extend against the inner surface of the constricted portion 16 of the nozzle 14 so as to minimize friction encountered during movement or rotation of the movable disk 40.

The face 56 of the stationary disk 22 is provided with teeth 58 along its peripheral margin as shown, and mating teeth 60 are placed on the peripheral margin of the abutting face 62 of the movable disk 40. The teeth extend longitudinally outward from the toothed face of each disk to permit the teeth of one disk to engage the teeth of the other disk when they are brought together.

The movable disk 40 is normally spaced slightly from the stationary disk 22, permitting the opposing teeth 58 and 60 to clear each other, so that disk 40 may be rotated. Coiled springs 64 placed in recesses 66 formed in stationary disk 22 as shown, extend out of the face 56 and press against the face 62 of movable disk 40, thus serving to keep the mating teeth 58 and 60 apart. Studs 67 and 68, are secured to the casing 10 by extending through bores 70 and 72, and have their threaded extensions fastened by nuts 74 and 76. The movable disk 40 is thus pressed against the studs by the springs 64 as shown.

Referring now to Figure 2, it is seen that when disk 40 is rotated to the position shown, the grooves 32, 34, 36 and 38 of stationary disk 22 are forty-five degrees out of alignment with the grooves 44, 46, 48 and 50 of movable disk 40 so that the clear passageway for the gases through the two disks 22 and 40 is reduced to the smallest cross-section. And when movable disk 40 is rotated forty-five degrees clockwise or counter-clockwise from the position shown in Figure 2, then each of the grooves of disk 40 is aligned with a groove of disk 22 and the clear gas passageway through the two disks is greatest in cross-section. It is thus apparent that it is only necessary to rotate movable disk 40 through forty-five degrees or one-eighth of a complete revolution to change the size of the clear gas passageway from minimum to maximum.

The rotation of movable disk 40 may be made manually and has been done in practice by inserting into the nozzle end an L-shaped key with the longer leg at an angle to the longitudinal axis of the nozzle so that the end of the shorter leg lies between discs 40 and 22 and the end of the longer leg protrudes from the nozzle. When the longer leg is then rotated from its inserted angular position until it is in the longitudinal axis of the nozzle the shorter leg will engage one of the teeth 60 of rotatable disc 40. If the longer leg of the key is now rotated about its axis the disc 40 will be turned. The size of the gas passageway thus set for optimum performance depending on the ambient temperature existing at the time the rocket is ready to be fired. Or the disks may be adjusted automatically by a device which changes the angular position of the grooves of movable disk 40 relative to the position of the grooves of stationary disk 22 to suit the ambient temperature. This may be done by means of a temperature responsive element adapted to rotate movable disk 40 as the element expands or contracts due to temperature changes, so that no matter what the ambient temperature is, the gas passageway is of a size corresponding to that temperature. Then, when the rocket is to be fired, it is already set for proper gas passageway size and needs no further adjustment for this purpose.

According to the present invention, this is done as shown in the drawings by providing a stud 78 having one end 80 fixed into a recess 82 in stationary disk 22 as shown and its other end 84 projecting into an arcuate recess 86 formed in the mating face 62 of movable disk 40 as shown. A temperature responsive element 88 is placed in the recess 86 with one end secured to the stud 78 and the other end secured to the end 90 of the recess 86. The element 88 may be of any convenient design and as shown takes the form of a coiled bi-metallic element adapted to expand along its axis as ambient temperature increases.

As the length of the element 88 changes, the disk 40 is thus rotated relative to disk 22, varying the gas passageway cross-section as already explained. The recess 86 is of dimensions sufficiently large to permit the element 88 to perform its functions therein.

Assuming then a given ambient temperature just prior to firing the rocket, the present construction assures that the movable disk 40 has been automatically rotated to the proper angular displacement relative to stationary disk 22 so that the size of the gas passageway through the disks is appropriate to the ambient temperature. When the rocket is fired, the inertia and combustion chamber pressure forces the movable disk 40 back against the stationary disk 22, overcoming the strength of the separator springs 64 and causing the teeth 60 on the movable disk to engage and mate with the teeth 58 on the stationary disk 22, thus preventing any further rotation of disk 40 relative to disk 22 thereafter.

By thus providing means for varying the outlet orifice cross-section to maintain the equilibrium condition of the gases inside the gas chamber at various ambient temperatures, the danger is avoided, in the one case, of having the pressure rise sharply when the rocket is ignited to such a high value as to explode the casing. Similarly, in the other case, the outlet orifice is kept from being so large in cross-section as to prevent the gas pressure from rising to a sufficient value to propel the rocket.

While the foregoing specification sets forth the invention in specific terms, it is to be understood that numerous changes in the shape, size, arrangement and materials may be resorted to without departing from the spirit and scope of the invention as claimed herein.

I claim:

1. In a rocket or the like having a casing provided with a combustion chamber an outwardly divergent nozzle axially aligned with said combustion chamber and a restricted throat passage between the said combustion chamber and the said nozzle, rotatable means and fixed means in said throat passage, said rotatable means and said fixed means having registering apertures cooperating to vary the size of the said throat, engaging means on corresponding facing portion of said rotatable means and said fixed means, and yielding means cooperating with said rotatable means and said fixed means to urge the said engaging means apart.

2. In a rocket or the like having a casing provided with a combustion chamber an outwardly divergent nozzle axially aligned with said combustion chamber and a restricted throat passage between said combustion chamber and said nozzle, means in said throat passage for varying the size thereof said means comprising a pair of discs in axial alignment, each of said discs provided with apertures adapted to register for maximum passage area, one of said discs arranged for rotation relative to the other for reducing the said passage area, engaging means on corresponding facing portions of said discs whereby they may engage each other and a plurality of springs between the said discs urging them apart.

3. The combination as set forth in claim 2 in which the apertures comprise a central area having four lobes extending radially therefrom, the axes of the said lobes being separated by ninety degrees, and the engaging means comprise teeth arranged on the peripheral margin of the faces of the discs.

LESLIE A. SKINNER.

REFERENCES CITED

The following references are of record in the file of this patent:

UNITED STATES PATENTS

| Number | Name | Date |
| --- | --- | --- |
| 273,757 | Morel | Mar. 13, 1883 |
| 323,568 | Doherty | Aug. 4, 1885 |
| 479,738 | Cunningham | July 26, 1892 |
| 961,179 | Unge | June 14, 1910 |
| 1,595,959 | Barrows | Aug. 10, 1926 |
| 1,901,852 | Stolfa et al. | Mar. 14, 1933 |
| 1,999,921 | Burkhardt | Apr. 30, 1935 |
| 2,063,592 | Rochemont | Dec. 8, 1936 |
| 2,072,556 | Hibner, Jr. | Mar. 2, 1937 |
| 2,481,059 | Africano | Sept. 6, 1949 |

FOREIGN PATENTS

| Number | Country | Date |
| --- | --- | --- |
| 166,583 | Great Britain | July 11, 1921 |